United States Patent
Showalter

(10) Patent No.: US 6,691,845 B2
(45) Date of Patent: Feb. 17, 2004

(54) BALL RAMP CLUTCH HAVING FORCE AMPLIFYING CONFIGURATION

(75) Inventor: Dan Joseph Showalter, Plymouth, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 09/990,063

(22) Filed: Nov. 21, 2001

(65) Prior Publication Data

US 2003/0094343 A1 May 22, 2003

(51) Int. Cl.[7] ................................................ F16D 43/20
(52) U.S. Cl. .................... 192/35; 192/85 AA; 192/93 A
(58) Field of Search ............................... 192/35, 54.52, 192/84.7, 85 AA, 93 A

(56) References Cited

U.S. PATENT DOCUMENTS

| | | | | |
|---|---|---|---|---|
| 3,027,986 A | * | 4/1962 | Richmond | 192/85 AA |
| 3,048,247 A | * | 8/1962 | Cook et al. | 192/53.32 |
| 5,269,730 A | * | 12/1993 | Hirota | 475/150 |
| 5,464,084 A | * | 11/1995 | Aoki et al. | 192/35 |
| 5,469,950 A | * | 11/1995 | Lundstrom et al. | 192/85 |
| 5,485,904 A | * | 1/1996 | Organek et al. | 192/35 |
| 5,915,513 A | * | 6/1999 | Isley et al. | 192/35 |
| 5,954,173 A | * | 9/1999 | Sakai et al. | 192/35 |
| 2001/0011622 A1 | * | 8/2001 | Arai et al. | 192/35 |
| 2002/0033311 A1 | * | 3/2002 | Yamamoto et al. | 192/35 |

* cited by examiner

*Primary Examiner*—Saul Rodriguez
*Assistant Examiner*—Eric M. Williams
(74) *Attorney, Agent, or Firm*—Brinks Hofer Gilson & Lione; Greg Dziegielewski

(57) ABSTRACT

A preferred embodiment compound ball ramp clutch assembly for motor vehicle drive line components includes a force amplifying assembly having two ball ramp operators arranged in tandem. The clutch assembly includes a first ball ramp operator having opposed cam plates with load transferring balls, an electromagnetic coil, a rotor and an armature. When energized, the coil creates drag which causes separation of the plates of the first ball ramp operator which compresses a primary (pilot) clutch pack disposed in mechanical parallel with the cam plates and load transferring balls of a second ball ramp operator. A speed difference and drag across the second ball ramp operator compresses a secondary (main) clutch pack. Significantly increased torque carrying capacity is exhibited by such a compound or a tandem ball ramp clutch assembly.

12 Claims, 4 Drawing Sheets

BALL RAMP CLUTCH HAVING FORCE AMPLIFYING CONFIGURATION

BACKGROUND OF THE INVENTION

The invention relates generally to clutches and more specifically to a ball ramp clutch having a force amplifying configuration which has application in motor vehicle drive line components.

Friction clutch packs find application in a broad range of power and torque transfer systems. Such clutch packs require a force parallel to the axis of the clutch pack to clamp the multiple interleaved friction plates together to transfer rotary power. The torque transmitted at any friction surface is equal to the clamping force at the interface times the mean radius of the friction surface. To increase the torque throughput of such a clutch, the mean radius of the clutch plates may be increased, additional plates may be added or the compressive force may be raised.

Increasing the mean radius of the friction plates is often an unworkable solution as the available space for a clutch, particularly in motor vehicle drive line components may be tightly constrained. Increasing the number of clutch plates is subject to a law of diminishing return due to the axial sliding friction generated within the clutch pack.

The foregoing suggests that increasing the force applied to the clutch pack may be the most convenient manner of increasing the torque throughput of a clutch. However, generation of a greater compressive force typically requires a larger, heavier, more expensive and typically slower acting force generator. This situation, in turn, suggests that the easily stated goal of increasing torque throughput through a multi-plate friction clutch pack when the design constraints include exterior size and operator weight and speed render improvement more challenging. The present invention is directed to improvements in ball ramp multi-plate friction clutches which improve torque throughput and performance.

SUMMARY OF THE INVENTION

A preferred embodiment compound ball ramp clutch assembly for motor vehicle drive line components includes a force amplifying assembly having two ball ramp operators arranged in tandem. The clutch assembly includes a first ball ramp operator having opposed cam plates with load transferring balls, an electromagnetic coil, a rotor and an armature. When energized, the coil creates drag which causes separation of the plates of the first ball ramp operator which compresses a primary (pilot) clutch pack disposed in mechanical parallel with the cam plates and load transferring balls of a second ball ramp operator. A speed difference and drag across the second ball ramp operator compresses a secondary (main) clutch pack. Significantly increased torque carrying capacity is exhibited by such a compound or tandem ball ramp clutch assembly. In an alternate embodiment, the electromagnetic coil and first ball ramp operator are replaced by a hydraulic operator assembly.

Thus it is an object of the present invention to provide a multi-plate friction clutch having tandem ball ramp operators providing increased torque throughput.

It is a further object of the present invention to provide a multi-plate friction clutch having increased torque throughput for use in motor vehicle drive line components such as transfer cases and differentials.

It is a still further object of the present invention to provide a multi-plate friction clutch having an electromagnetic or hydraulic operator and primary and secondary clutch packs acted upon by respective operators.

It is a further object of the present invention to provide a multi-plate friction clutch assembly having electromagnetic or hydraulic operators which actuate respective ball ramp operator assemblies.

Further objects and advantages of the present invention will become apparent by reference to the following descriptions of the preferred and alternate embodiments and appended drawings wherein like reference numbers refer to the same component, element or feature.

DETAILED DESCRIPTION OF THE PREFERRED AND ALTERNATE EMBODIMENTS

Figure 1:
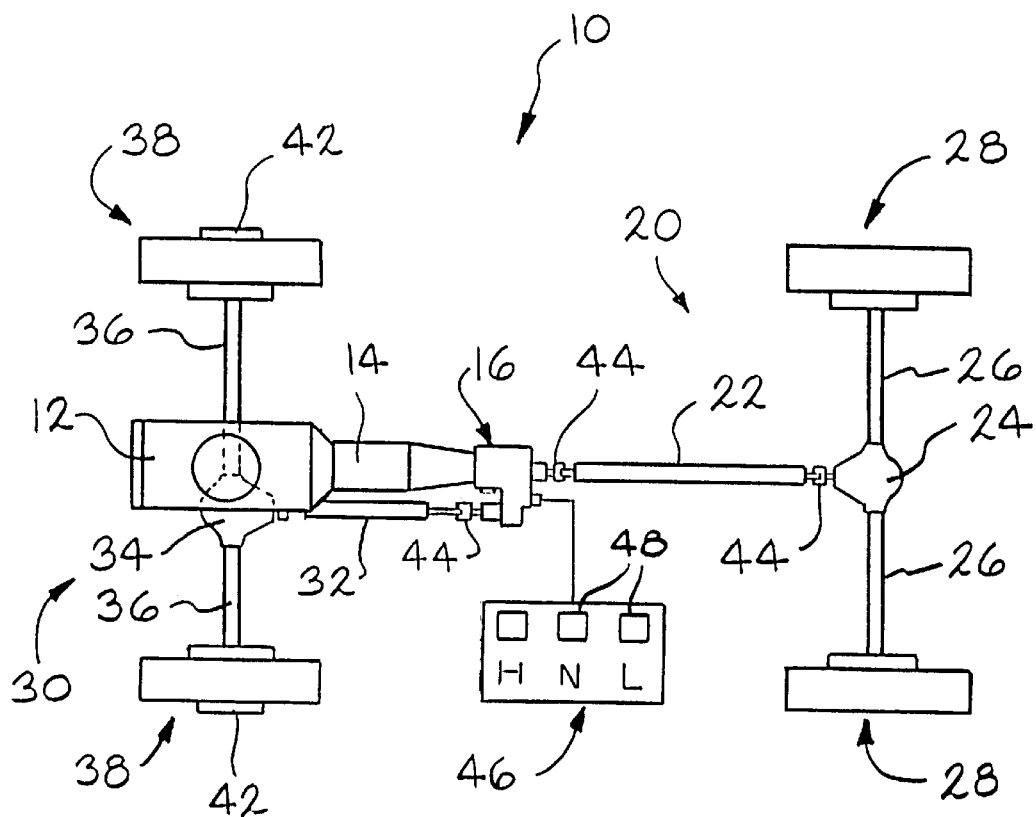
FIG. 1 is a diagrammatic, plan view of a four-wheel drive motor vehicle having a transfer case incorporating a clutch according to the present invention.

Referring now to FIG. 1, a four-wheel vehicle drive train is diagrammatically illustrated and designated by the reference number 10. The four-wheel vehicle drive train 10 includes a prime mover 12 which is coupled to and directly drives a transmission 14. The transmission 14 may either be an automatic or manual type. The output of the transmission 14 directly drives a transfer case assembly 16 which provides motive power to a primary or rear drive line 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front drive line 30 comprising a secondary or front prop shaft 32, a secondary or front differential assembly 34, a pair of live secondary or front axles 36 and a respective pair of secondary or front tire and wheel assemblies 38. The front tire and wheel assemblies 38 may be directly coupled to a respective one of the pair of front axles 36 or, if desired, a pair of manually or remotely activateable locking hubs 42 may be operably disposed between a respective one of the pair of front axles 36 and a respective one of the tire and wheel assemblies 38 to selectively connect same. Finally, both the primary drive line 20 and the secondary drive line 30 may include suitable and appropriately disposed universal joints 44 which function in conventional fashion to allow static and dynamic offsets and misalignments between the various shafts and components. A control console 46 which is preferably located within convenient reach of the vehicle operator includes a switch or a plurality of individual switches or push buttons 48 which facilitate selection of the operating mode of the transfer case assembly 16 as will be further described below.

The foregoing and following description relates to a vehicle wherein the rear drive line 20 functions as the primary drive line, i.e., it is engaged and operates substantially all the time and, correspondingly, the front drive line 30 functions as the secondary drive line, i.e., it is engaged and operates only part-time or in a secondary or supplemental fashion.

These designations, "primary" and "secondary", however, are utilized herein rather than "front" and "rear" inasmuch as the invention herein disclosed and claimed may be readily utilized in transfer cases wherein the primary drive line 20 is disposed at the front of the vehicle and the secondary drive line 30 is disposed at the rear of the vehicle. Such designations "primary" and "secondary" thus broadly and properly characterize the function of the individual drive lines rather than their specific locations.

Figure 2:
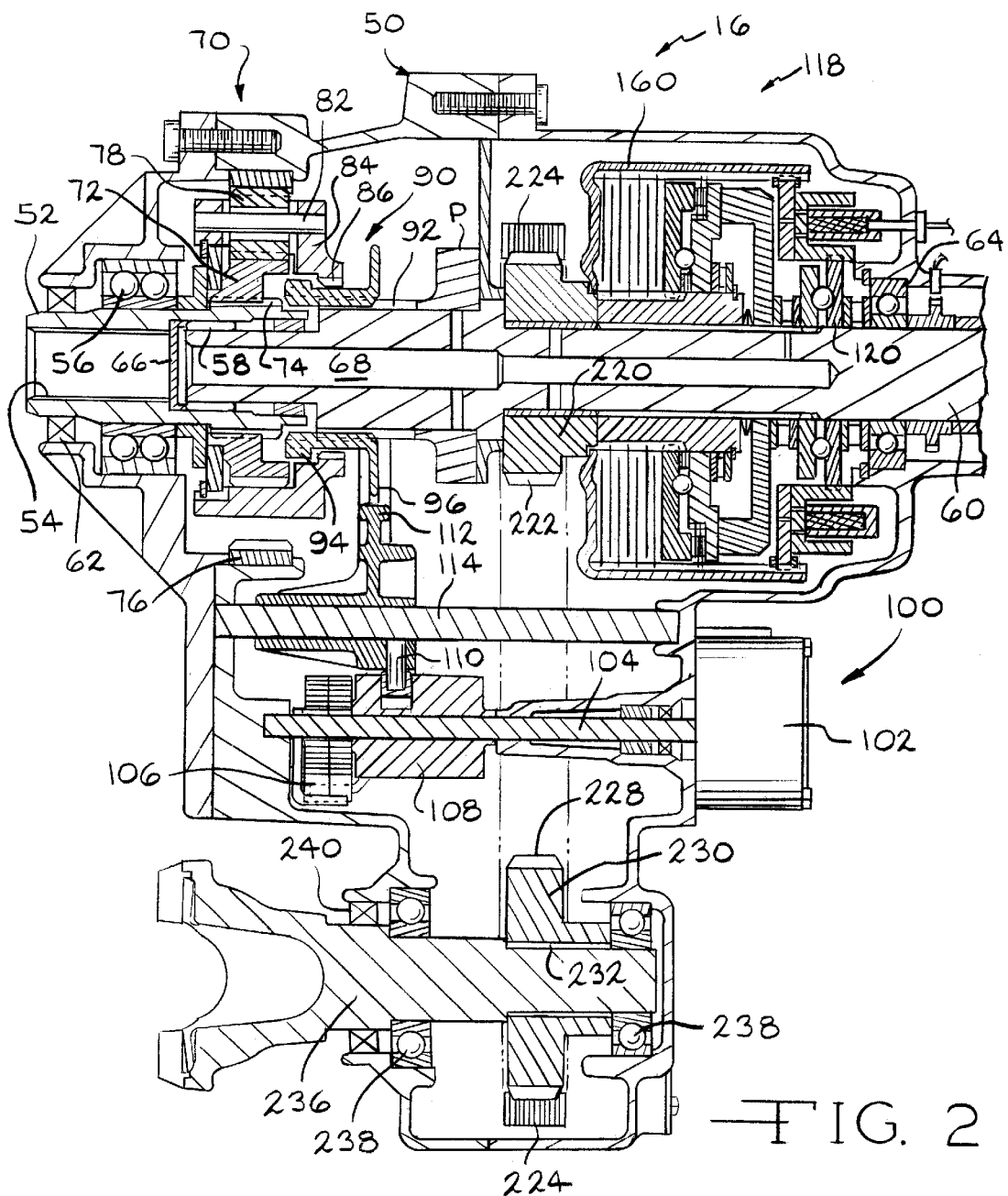
FIG. 2 is a full, sectional view of a transfer case incorporating a ball ramp clutch according to the present invention.

Referring now to FIGS. 1 and 2, the transfer case assembly 16 incorporating the present invention includes a multiple piece, typically cast, housing assembly 50 having planar and circular sealing surfaces, openings for shafts and bearings and various recesses, shoulders, flanges, counterbores and the like to receive various components and assemblies of the transfer case assembly 16. An input shaft 52 includes female or internal splines or gear teeth 54 or other suitable structure which drivingly couple an output of the transmission 14 illustrated in FIG. 1 to the input shaft 52. The input shaft 52 is rotatably supported by anti-friction bearings such as the bearing assemblies 56 and internally by an anti-friction bearing such as the roller bearing assembly 58. The roller bearing assembly 58 is disposed upon a reduced diameter portion of an output shaft 60. Suitable oil seals 62, positioned between the shafts 52 and 60 and the housing assembly 50, provide an appropriate fluid tight seal therebetween. The opposite end of the output shaft 60 is supported by an anti-friction bearing such as a ball bearing assembly 64. An end cap or seal 66 closes off the end of an axial passageway 68 in the output shaft 60. A gerotor pump P will typically be utilized to provide a flow of lubricating and cooling fluid to the axial passageway 68 which is thence distributed through a plurality of radial ports in the output shaft 60 to the components of the transfer case assembly 16.

The transfer case assembly 16 also includes a two-speed planetary (epicyclic) gear speed reduction assembly 70 disposed generally about the input shaft 52. The planetary gear assembly 70 includes a sun gear 72 having internal splines or gear teeth which are engaged by complementary external splines or gear teeth 74 formed on the input shaft 52. Radially aligned with the sun gear 72 is a ring gear 76. The ring gear 76 is fixedly retained within the housing assembly 50 by any suitable retaining structure such as a snap ring (not illustrated). A plurality of pinion gears 78 are rotatably received upon a like plurality of anti-friction roller bearings which, in turn, are supported and located by a like plurality of stub shafts 82. The plurality of stub shafts 82 are mounted within and secured to a planet carrier 84. The planet carrier 84 includes a plurality of internal splines or gear teeth 86. The planetary gear assembly 70 is more fully described in co-owned U.S. Pat. No. 4,440,042 which is herein incorporated by reference.

Adjacent and cooperating with the planetary gear assembly 70 is a dog clutch collar 90 having elongate internal splines or gear teeth which are slidably received upon a complementary plurality of external splines or gear teeth 92 on the output shaft 60. The clutch collar 90 thus rotates with the output shaft 60 but may translate bi-directionally therealong. The clutch collar 90 also includes a set of external splines or gear teeth 94 on one end which are in all respects complementary to the internal splines or gear teeth 86 on the planet carrier 84. The end of the clutch collar 90 opposite the splines or gear teeth 94 defines a circumferentially and radially extending flange 96.

The clutch collar 90 is capable of three positions and operational modes. In FIG. 2, the clutch collar 90 is illustrated in its center or neutral position wherein both the input shaft 52 and the planet carrier 84 are disconnected from the output shaft 60 and no power is transmitted therebetween. When translated to the left, direct drive is achieved when the internal splines or gear teeth of the clutch collar 90 engage the external splines or gear teeth 74 on the input shaft 52 thereby directly coupling the input shaft 52 to the output shaft 60 and providing direct or high gear drive therebetween.

When the clutch collar 90 is moved to the right from the position illustrated in FIG. 2, the speed reduction achieved by the planetary gear assembly 70 is engaged through engagement of the external splines or gear teeth 94 on the clutch collar 90 with the internal splines or gear teeth 86 on the planet carrier 84. So engaged, the planetary gear assembly 70 is active and provides a speed reduction, typically in the range of from 3:1 to 4:1 between the input shaft 52 and the output shaft 60.

The position of the clutch collar 90 is commanded by an electric shift control assembly 100. The shift control assembly 100 includes an electric drive motor 102 which receives control signals or instructions originating with the switches or push buttons 48. The drive motor 102 has an output shaft 104 coupled, preferably through an energy storing spring 106, to a cam 108 which axially positions a cam follower 110. The cam follower 110 translates a shift fork 112 slidably disposed upon a shift rail 114 which engages the flange 96 of the dog clutch collar 90.

Figure 4:
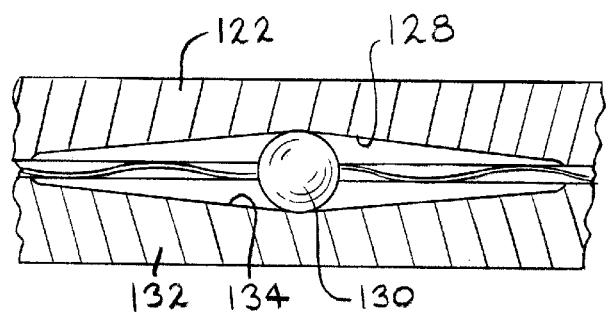
FIG. 4 is a flat pattern development of a ball ramp operator taken along line 4—4 of FIG. 3.
Figure 3:
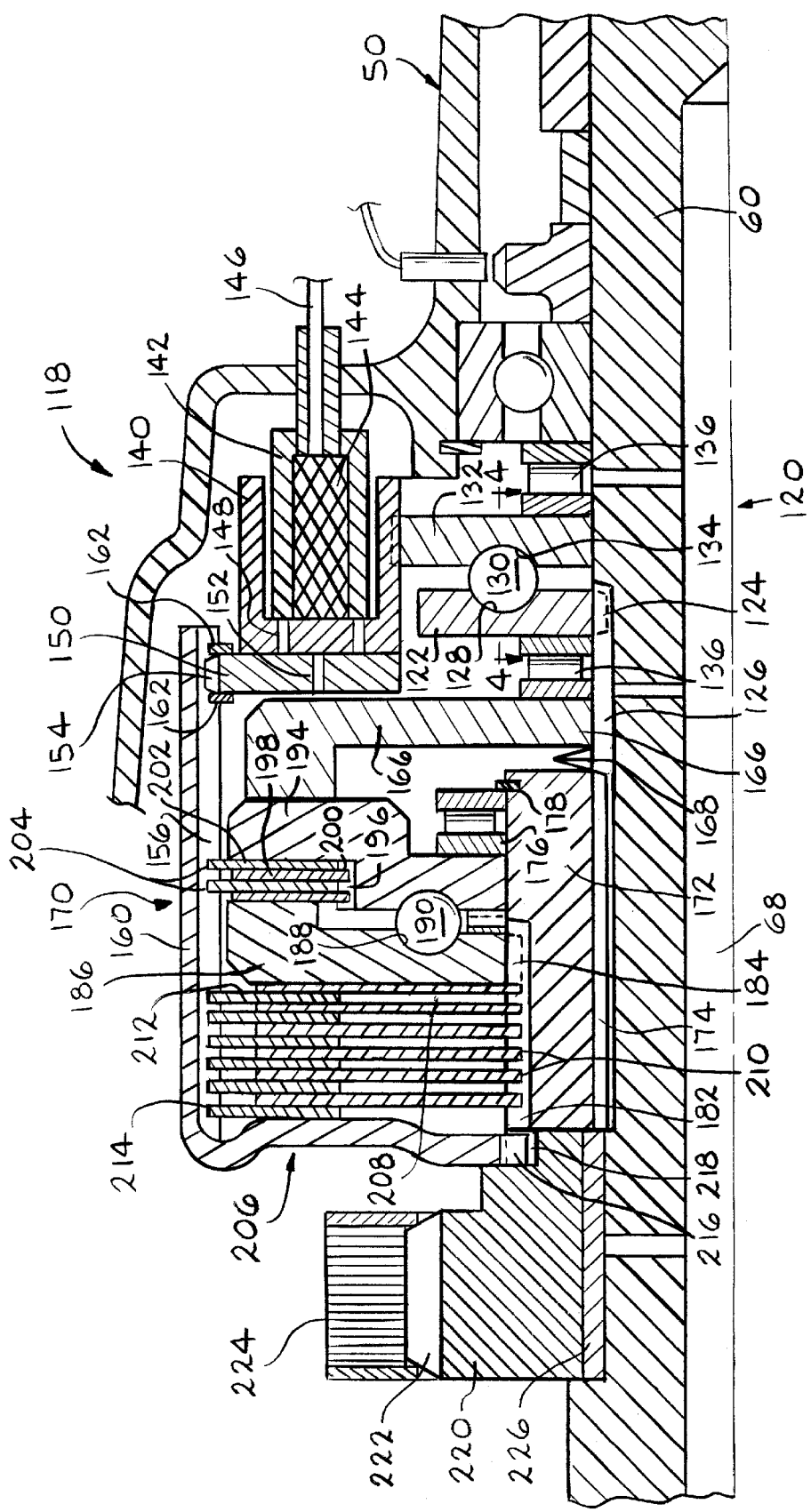
FIG. 3 is an enlarged, fragmentary, sectional view of a friction clutch assembly having primary and secondary clutch packs and respective ball ramp operators actuated by an electromagnetic operator.

Referring now to FIGS. 2, 3 and 4, the transfer case assembly 16 also includes a preferred embodiment compound or force amplifying ball ramp clutch assembly 118 according to the present invention. The preferred embodiment compound ball ramp clutch assembly 118 includes a primary or pilot ball ramp assembly 120 having a first circular drive member 122 having internal splines or gear teeth 124 which engage male splines or gear teeth 126 on the primary output shaft 60. The first circular drive member 122 thus positively rotates with the primary output shaft 60. The circular drive member 122 defines a plurality of recesses 128 in the shape of an oblique section of a helical torus which each receive a load transferring ball 130. Disposed in facing opposition to the first circular drive member 122 is a first circular driven member 132. It will be appreciated that the recesses 128 and 134 and the load transferring balls 130 may be replaced with other analogous mechanical elements which cause axial displacement of the circular members 122 and 132 in response to relative rotation therebetween. For example, tapered rollers disposed in complementarily configured conical helices may be utilized. The first circular driven member 132 likewise defines a plurality of recesses 134 in the shape of an oblique section of a helical torus which are complementary to the recesses 128 and also receive the load transferring balls 130. It will be appreciated that the recesses 128 and 134 and the load transferring balls 130 may be replaced with other analogous mechanical elements which cause axial displacement of the circular members 122 and 132 in response to relative rotation therebetween. For example, tapered rollers disposed in complementarily configured conical helices may be utilized.

The first circular drive member 122 and the first circular driven member 132 are flanked by a pair of thrust bearings 136. The first circular driven member 132, which is free to rotate about the primary output shaft 60, is secured by splines, an interference fit, welds or similar positive means to a U-shaped soft iron rotor 140. The rotor 140 receives a stationary coil housing 142 having an electromagnetic coil 144 disposed therein. Electrical energy is provided to the electromagnetic coil 144 through an electrical conductor 146.

Preferably, the face of the rotor 140 includes a plurality of discontinuous, arcuate banana slots 148 which direct and concentrate the magnetic flux between the rotor 140 and an adjacent circular armature 150. The circular armature 150 includes a plurality of discontinuous, arcuate banana slots 152 which are preferably radially centered between the banana slots 148 in the rotor 140. The circular armature 150 includes external or male splines or gear teeth 154 which engage and positively drive internal or female splines or gear teeth 156 within a bell shaped output housing 160. The axial position of the circular armature 150 is preferably fixed by a pair of snap rings 162 which are received within suitable grooves in the output housing 160. When the electromagnetic coil 144 is energized, and a speed difference exists between the primary output shaft 60 and the output housing 160, drag created at the interface of the rotor 140 and the armature 150 causes relative rotation between the first circular drive member 122 and the first circular driven member 132, and the load transferring balls 130 climb the ramps 128 and 134 and axially displace the first circular drive member 122 to the left as illustrated in FIG. 3.

Adjacent the primary or pilot ball ramp assembly 120 and specifically adjacent the left thrust bearing assembly 136 (as viewed in FIG. 3) is a primary apply plate 166. A compression spring 168 which may take the form of one or a plurality of wave washers or Belleville springs biases the primary apply plate 166 to the right as illustrated in FIG. 3. The primary apply plate 166 is circular and includes a shoulder or face which is disposed axially and radially adjacent a secondary or main ball ramp assembly 170. The secondary ball ramp assembly 170 includes a clutch hub 172 having internal or female spines or gear teeth 174 which engage and are driven by the male or external splines or gear teeth 126 on the primary output shaft 60. The clutch hub 172 includes external or male splines or gear teeth 182 which drivingly engage female or internal splines or gear teeth 184 in a second circular drive member 186. The second circular drive member 186 includes a plurality of circumferentially spaced apart ramped recesses 188 having the shape of an oblique section of a helical torus which each receive a load transferring ball 190. A plurality of load transferring balls 190 are received within a like plurality of ramped recesses 192 in a second circular driven member 194. It will be appreciated that the recesses 188 and 192 and the load transferring balls 190 may be replaced with other analogous mechanical elements which cause axial displacement of the circular members 186 and 194 in response to relative rotation therebetween. For example, tapered rollers disposed in complementarily configured conical helices may be utilized.

Force from the primary apply plate 166 is applied to the second circular driven member 194. The second circular driven member 194 includes a set of male or external splines or gear teeth 196 which engage and drive a first plurality of friction clutch plates 198 having female or internal splines or gear teeth 200. The first plurality of friction clutch plates 198 are interleaved with a second plurality of friction clutch plates 202 having external splines or gear teeth 204 which engage the internal or female splines or gear teeth 156 on the output housing 160.

As illustrated, the friction clutch plates 198 and 202 are disposed between opposed, parallel faces of the second circular drive member 186 and the second circular driven member 194. The friction clutch plates 198 and 202 define a primary or pilot clutch pack assembly. A secondary or main clutch pack assembly 206 includes a first plurality of smaller main friction clutch plates 208 having internal or female splines or gear teeth 210 which are positively engaged and driven by the splines 182 on the clutch hub 172. Interleaved with the plurality of smaller main friction clutch plates 210 is a second plurality of larger main friction clutch plates 212 having a plurality of male or external splines or gear teeth 214 which positively engage the internal or female splines or gear teeth 156 on the output housing 160.

The output housing 160 includes inwardly directed lugs or female splines 216 which engage and drive complementarily configured lugs or male splines or gear teeth 218 on a chain drive sprocket 220. The chain drive sprocket 220 includes chain drive teeth 222 which engage a drive chain 224. The chain drive sprocket 220 is supported for free rotation about the primary output shaft by a needle or journal bearing 226.

The drive chain 224 is received upon complementarily configured chain teeth 228 on a driven chain sprocket 230 having internal splines or gear teeth 232 which engage and couple the driven chain sprocket 230 to a secondary output shaft 236. The secondary output shaft 236 is freely rotatably supported within the housing assembly 50 by a pair of spaced apart anti-friction assemblies such as ball bearing assemblies 238. A suitable oil seal 240 provides a fluid tight seal between the rotating secondary output shaft 236 and the housing assembly 50.

Figure 5:
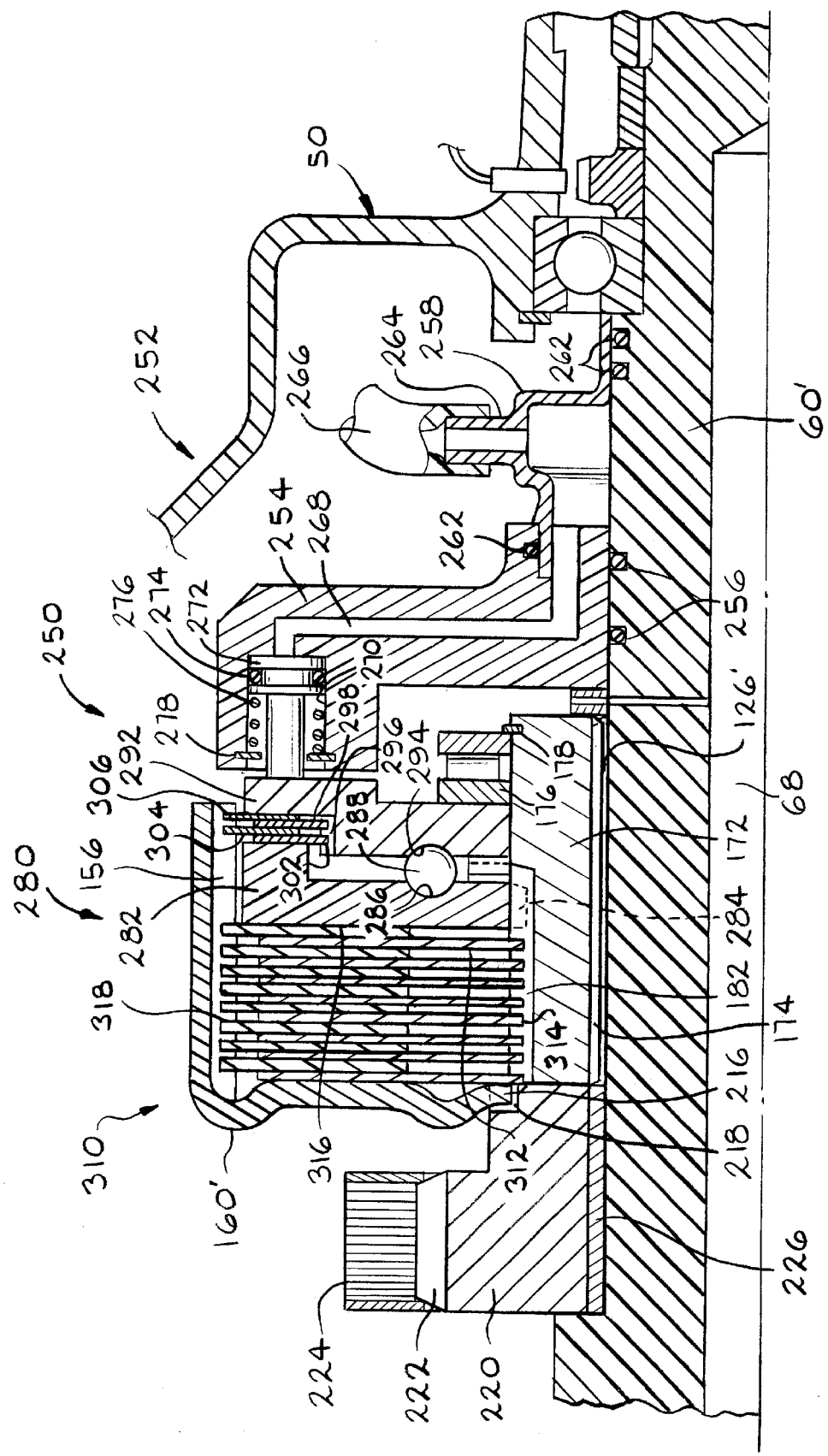
FIG. 5 is an enlarged, fragmentary, sectional view of an alternate embodiment friction clutch assembly having primary and secondary clutch packs and a ball ramp operator actuated by a hydraulic operator.

Referring now to FIGS. 2 and 5, an alternate embodiment compound or force amplifying ball ramp assembly according to the present invention is illustrated and designated by the reference number 250. The alternate embodiment compound ball ramp assembly 250 includes a hydraulic operator assembly 252 rather than the primary or pilot ball ramp assembly 120, but in many other respects is the same as the preferred embodiment ball ramp assembly 118 described directly above.

The hydraulic operator assembly 252 includes a bell-shaped hydraulic operator housing 254 which is received about a primary output shaft 60' and hydraulically sealed thereabout by a plurality of O-ring seals 256. A stationary collar 258 is also disposed about the primary output shaft 60' and sealed both to the hydraulic operator housing 254 and about the primary output shaft 60' by a plurality of O-ring seals 262. The collar 258 includes a hydraulic inlet fitting 264 which receives a hydraulic line 266 which is coupled to a suitable, controlled source of hydraulic fluid (not illustrated).

The hydraulic operator housing 254 defines a plurality of internal radial passageways 268 which are in fluid communication with the hydraulic supply line 266. The plurality of hydraulic passageways 266 communicate with and terminate in a plurality of hydraulic cylinders 270 which are arrayed circumferentially about the axis of the primary output shaft 60'. Preferably at least three cylinders 270 are utilized and arrayed at 120° intervals. Four, six, eight or more cylinders 270, spaced at equal circumferential intervals, i.e., 90°, 60° and 45°, respectively, may readily be used. Each of the cylinders 270 receives an axially sliding piston 272. The pistons 272 include suitable O-ring seals 274 and suitable compression springs 276 which extend between the backsides of the pistons 272 and suitable snap rings 278. The compression springs 274 thus bias the pistons 272 to the right as illustrated in FIG. 5, to their retracted positions.

The primary output shaft 60' includes a region of male or external splines or gear teeth 126' which receives the clutch hub 172. The clutch hub 172 includes internal or female spines or gear teeth 174 which engage the splines or gear teeth 126' and couple the clutch hub 172 to the primary output shaft 60'. A thrust bearing 176 is disposed about the clutch hub 172 and retained thereupon by a snap ring 178 received within a suitable circumferential groove in the clutch hub 172.

Adjacent the hydraulic operator assembly 252 and specifically aligned with the pistons 272 is an intermediate, ball ramp operator 280. The intermediate, ball ramp operator 280 includes a circular driven member 282 having female or internal splines or gear teeth 284 which mate with male or external splines or gear teeth 182 on the clutch hub 172. The circular driven member 282 thus rotates with the clutch hub 172 and the primary output shaft 60'. The circular driven member 282 defines a plurality of ramped recesses 286 having a shape of an oblique section of a defined helical torus. Disposed within the plurality of ramped recesses 286 are a like plurality of load transferring balls 288. Disposed in facing opposition with the circular drive member 282 is a circular driven member 292. The circular driven member 292 defines a like plurality of ramped recesses 294 which also receive the load transferring balls 288. It will be appreciated that the recesses 286 and 294 and the load transferring balls 288 may be replaced with other analogous mechanical elements which cause axial displacement of the circular members 282 and 292 in response to relative rotation therebetween. For example, tapered rollers disposed in complementarily configured conical helices may be utilized.

The circular driven member 292 is offset and defines a shoulder having a plurality of external or male splines or gear teeth 296 which engage a first plurality of smaller friction clutch plates 298 having suitable internal or female splines or gear teeth 302. The first plurality of clutch plates 298 are interleaved with a second plurality of larger friction clutch plates 304 having external or males splines or gear teeth 306 which engage and couple the splines to internal or female splines or gear teeth 156 on a bell-shaped output housing 160'.

Residing between the first circular drive member 282 and a radially and circumferentially extending portion of the output housing 160' is a main friction clutch pack assembly 310. The main friction clutch pack assembly 310 includes a first plurality of smaller diameter friction clutch plates 312 having splines 314 which engage the splines 182 on the clutch hub 172. Thus, the first plurality of smaller diameter of friction clutch plates 312 rotate with the clutch hub 172 and the primary output shaft 60'. Interleaved with the first plurality of friction clutch plates 312 is a second plurality of larger diameter friction clutch plates 316 having external or male splines or gear teeth 318 which engage and couple with the female or internal splines or gear teeth 156 on the output housing 160' such that the second plurality of friction clutch plates 316 rotates therewith.

The bell-shaped output housing 160' includes lugs or internal splines or gear teeth 216 which engage complementarily configured lugs or male splines or gear teeth 218 on the chain drive sprocket 220 having the plurality of chain drive teeth 222 which engage and drive the drive chain 224.

The chain drive sprocket 220 is freely rotatably supported upon the output shaft 60' by the needle or journal bearing 226.

Operation of the preferred embodiment compound or force amplifying ball ramp clutch assembly 118 according to the present invention will now be described. When a speed difference exists between the primary output shaft 60 and the output housing 160 (and the associated chain drive sprocket 220 and the secondary output shaft 236) and the electromagnetic coil 144 is energized, magnetic attraction between the rotor 140 and the armature 150 creates drag which drives the speed of the first circular driven member 132 toward that of the first circular drive member 122, thereby causing the load transferring balls 130 to travel up the ramped recesses 128 and 134, separating the circular drive member 122 from the first circular driven member 132 and translating the apply plate 166 to the left as illustrated in FIG. 3, toward the second circular driven member 194.

In turn, compression of the friction clutch plates 200 and 202 of the secondary ball ramp assembly 170 likewise causes drag and a speed difference between the second driven circular member 194 and the second circular drive member 186 to rotate relative to one another and drive the load transferring balls 190 up the ramped recesses 188 and 192, translating the second circular drive member 186 toward the main clutch pack assembly 206. Compression of the main clutch pack assembly 206 transfers torque from the primary output shaft 60, through the clutch hub 172, to the output housing 160 and the chain drive sprocket 220. When the electromagnetic coil 144 is de-energized, the compression spring 168 provides a restoring force which translates the apply plate 166 to the right as illustrated in FIG. 3, releasing compressive force on the secondary ball ramp assembly 170 and the main clutch pack assembly 206, thereby terminating the transfer of torque and energy through the ball ramp clutch assembly 118.

Operation of the alternate embodiment compound or force amplifying ball ramp assembly 250 is similar except that the initial axial force is generated by the hydraulic operator assembly 252 rather than by the primary or pilot ball ramp assembly 120. That is, hydraulic fluid under pressure is provided through the hydraulic line 266 to the plurality of cylinders 270. The pistons 272 translate axially to the left as illustrated in FIG. 5 in accordance with the hydraulic pressure applied and engage and translate the circular driven member 292, compressing the friction plates 298 and 304 creating drag, rotating the members 282 and 292 relative to one another such that the load transferring balls 288 ride up the ramped recesses 286 and 294 and separate the circular drive member 282 from the circular driven member 292 thereby compressing the main or primary friction clutch pack assembly 310 which transfers torque or energy between the primary input shaft and the clutch hub 172 to the output housing 160' and the chain drive sprocket 200.

An important design consideration of the components of all of the ball ramp operator assemblies 120, 170 and 280 is that their geometry, such as the ramp angles of the recesses, the spring rate of the compression springs and the clearances in the assembly ensure that the assemblies are neither self-engaging nor self-locking. The ball ramp operator assemblies 120, 170 and 280 must not self-engage but rather must be capable of controlled, proportional engagement of the associated clutches and torque transfer in direct, proportional response to the control input.

It will be appreciated that the sequential or compound operation of the clutch assemblies 118 and 250 according to the present invention provides greatly increased torque throughput.

It will also be appreciated that the sequential or compound operation of the clutch assemblies 118 and 250 according to the present invention improves performance during directional reversals of the associated drivelines.

The foregoing disclosure is the best mode devised by the inventor for practicing this invention. It is apparent, however, that devices incorporating modifications and variations will be obvious to one skilled in the art of compound or force amplifying clutches. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A compound clutch assembly comprising, in combination,
   a shaft having an axis,
   a first axial force generating assembly disposed about said shaft and having at least one output feature translating parallel to said axis, said first axial force generating assembly including a ball ramp operator assembly having two plates defining ramped, ball receiving recesses, balls disposed in said recesses, a rotor, an electromagnetic coil and an armature;
   a second axial force generating assembly having a driven member acted upon by said output feature and defining a plurality of ramped recesses, a drive member coupled for rotation with said shaft and defining a like plurality of ramped recesses and a plurality of load transferring balls disposed in said ramped recesses,
   an output member,
   a first friction clutch pack disposed between said drive member and said driven member and having a first plurality of clutch plates coupled for rotation with said driven member and a second, interleaved plurality of clutch plates coupled for rotation with said output member,
   a second friction clutch pack disposed between said drive member and said output member and having a third plurality of clutch plates coupled for rotation with said shaft and a fourth plurality of clutch plates interleaved with said third plurality of clutch plates and coupled to said output member.

2. The clutch assembly of claim 1 further including a chain drive sprocket coupled to said output member.

3. The clutch assembly of claim 1 wherein said second axial force generating assembly, said first friction clutch pack and said second friction clutch pack are disposed on a hub on said output member.

4. The clutch assembly of claim 1 further including a transfer case and wherein said clutch assembly selectively transfers energy from said shaft to a secondary output.

5. A compound clutch assembly comprising, in combination,
   a shaft having an axis,
   a first axial force generating assembly disposed about said shaft and having at least one first output member disposed for translation parallel to said axis, said first axial force generating assembly includes a ball ramp operator assembly having two plates defining a plurality of ramped, ball receiving recesses, a plurality of balls, a rotor, an electromagnetic coil and an armature;
   a second axial force generating assembly having a first driven member acted upon by said first output member and defining a plurality of ramped recesses, a drive member coupled for rotation with said shaft and defining a like plurality of ramped recesses and a plurality of load transferring balls disposed in said ramped recesses,
   a second output member,
   a first friction clutch pack disposed between said drive member and said driven member and having a first plurality of clutch plates coupled for rotation with said driven member and a second, interleaved plurality of clutch plates disposed for rotation with said second output member,
   a second friction clutch pack disposed between said drive member and said second output member and having a third plurality of clutch plates coupled for rotation with said shaft and a fourth plurality of clutch plates interleaved with said third plurality of clutch plates and coupled to said second output member.

6. The clutch assembly of claim 5 further including a chain drive sprocket coupled to said output member.

7. The clutch assembly of claim 5 further including a transfer case having a secondary output and wherein said clutch assembly selectively transfers energy from said shafts to said secondary output.

8. A compound clutch assembly comprising, in combination,
   a first ball ramp operator assembly having a first pair of members defining opposed ramped recesses and load transferring members disposed in said recesses, a rotor, an electromagnetic coil, an armature and an apply plate,
   a second ball ramp operator assembly having a second pair of members defining opposed ramped recesses and load transferring members disposed in said recesses, said apply plate axially engaging one of said second pair of members,
   a first clutch pack disposed between said second pair of members of said second ball ramp operator assembly, and
   a second clutch pack disposed adjacent another one of said second pair of members and adapted to transfer torque from an input member to an output member.

9. The clutch assembly of claim 8 wherein said first and second pair of members are circular plates.

10. The clutch assembly of claim 8 wherein said load transferring members are balls.

11. The clutch assembly of claim 8 wherein said first and second clutch packs include a first set of smaller diameter friction clutch plates and a second set of larger diameter clutch plates interleaved with said first set of clutch plates.

12. The clutch assembly of claim 8 further including a clutch hub disposed for rotation with said input member and wherein said output member is associated with a plurality of plates of said second clutch pack.

\* \* \* \* \*